United States Patent Office 3,519,932
Patented July 7, 1970

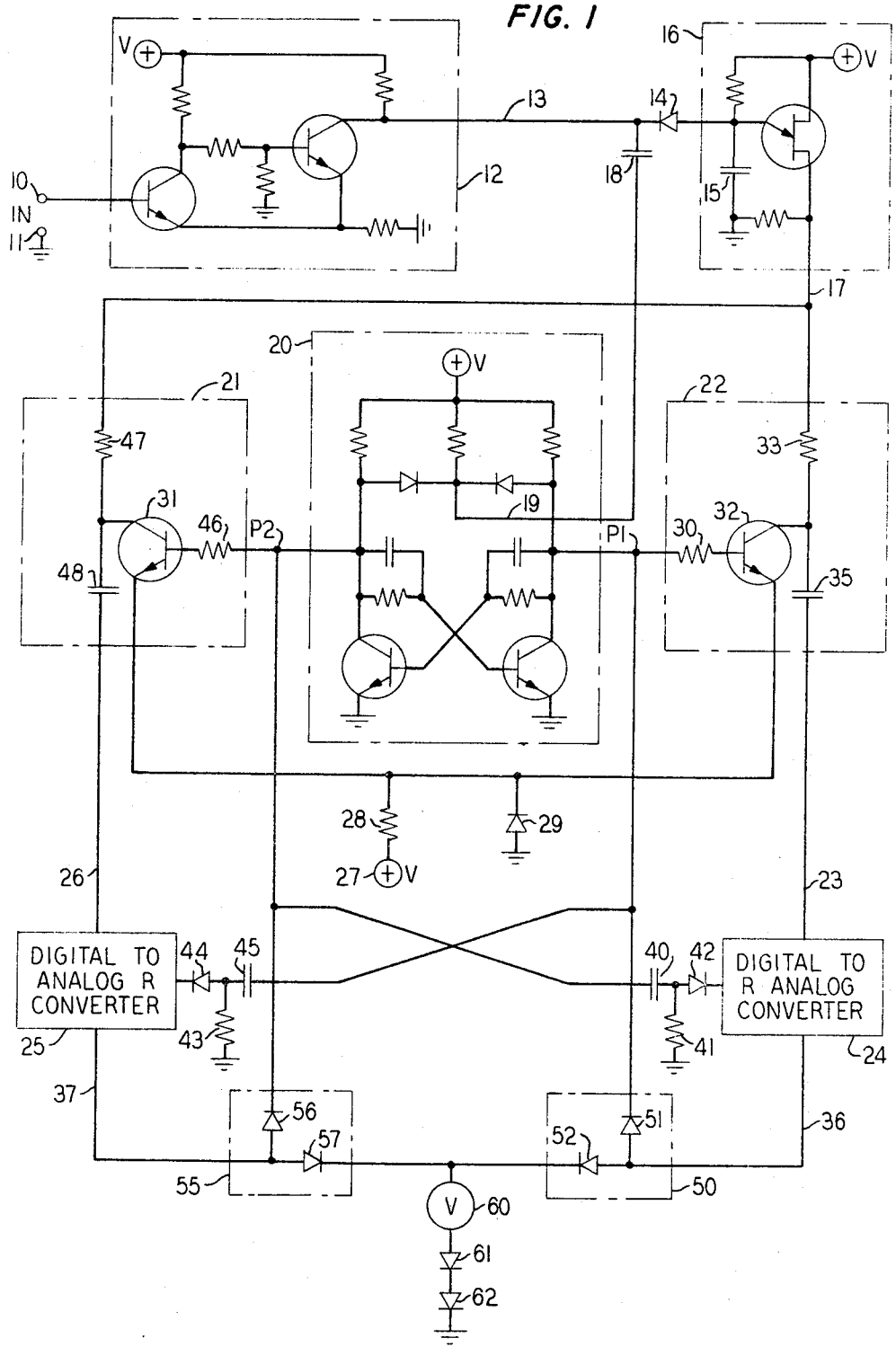

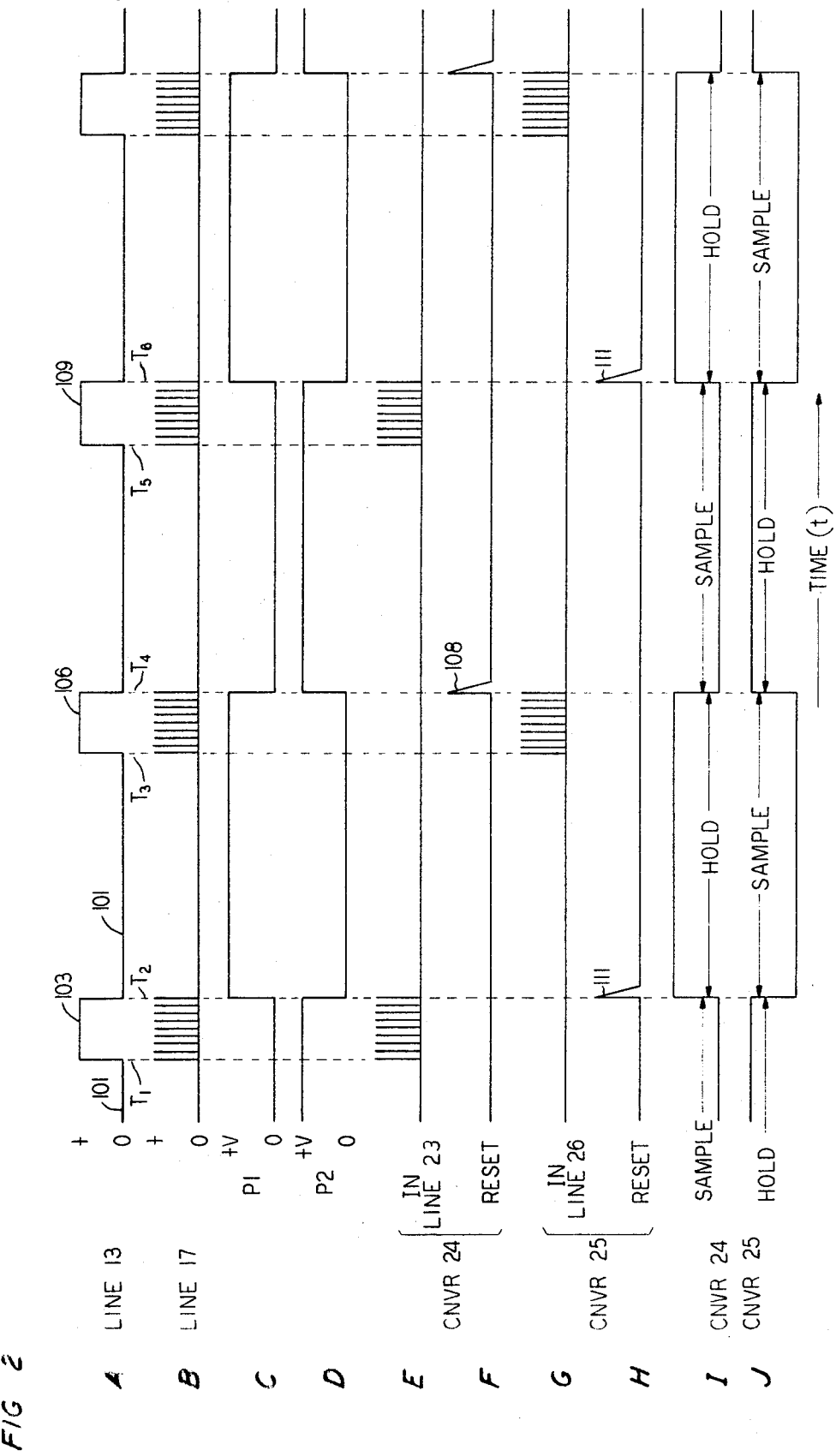

3,519,932
PULSE WIDTH MEASURING APPARATUS
Roger D. Baum, Middletown, and David L. Favin, Little
 Silver, N.J., assignors to Bell Telephone Laboratories,
 Incorporated, Murray Hill, N.J., a corporation of New
 Jersey
Filed June 13, 1968, Ser. No. 736,689
Int. Cl. G01r *19/00, 19/26*
U.S. Cl. 324—102                        7 Claims

ABSTRACT OF THE DISCLOSURE

Each input pulse in a pulse train is caused to gate a unijunction transistor relaxation oscillator thereby producing groups of voltage impulses during each input pulse interval. The trailing edge of each input pulse is also caused to trigger a bistable multivibrator. Transistor gates connected to each side of the bistable multivibrator steer alternate groups of the voltage impulses to the inputs of each one of two digital to analog converters. Each converter in response to the voltage impulses produces a D.C. voltage at its output proportional in magnitude to the number of impulses. Diode gates connected to each side of the bistable multivibrator switch a D.C. voltmeter between the two converter outputs, thereby providing the meter with a continuous D.C. voltage the magnitude of which is a measure of the average input pulse width.

BACKGROUND OF THE INVENTION

In the prior art, the most straightforward method of measuring the average pulse width in a pulse train has been to integrate the pulse train in order to produce a D.C. voltage the value of which indicates the average duration of the pulse, providing that the pulse repetition rate remains constant. For pulse trains with a very low duty cycle, the integration must be performed by a circuit having a very long time constant in order to reduce meter fluctuation. A long time constant, however, results in a very slow and sluggish circuit.

Still other circuits of the type shown in Pat. No. 2,749,514 of June 5, 1956, to F. P. Zaffarano, have utilized a pulse train to gate voltage impulses to a counter which in turn provides a digital indication of the number of impulses which have been permitted to pass during each input voltage pulse interval. This digital indication is, of course, a direct measurement of the average input pulse width. The digits, however, must be indicated on devices such as Nixie tubes, and several of such devices are more expensive than a single D.C. voltmeter. In addition, a counter must be reset, and even though a single counter may provide a D.C. voltage at its output in place of a digital indication, resetting of the counter would interrupt its output D.C. voltage and thereby introduce a fluctuation in any D.C. voltmeter connected to the output of a single counter.

SUMMARY OF THE INVENTION

The primary object of the present invention is to measure the average pulse width of input pulses on a D.C. voltmeter.

Another object of the present invention is to measure the average pulse width of input pulses by utilizing a circuit which is fast-acting in its operation.

These and other objects are attained in accordance with the present invention wherein each input pulse in a pulse train is caused to gate a unijunction transistor relaxation oscillator thereby producing groups of voltage impulses during each input pulse interval. The trailing edge of each input pulse is also caused to trigger a bistable multivibrator. Transistor gates connected to each side of the bistable multivibrator steer alternate groups of the voltage impulses to the inputs of each one of two digital to analog converters. Each converter in response to the voltage impulses produces a D.C. voltage at its output proportional in magnitude to the number of impulses. Diode gates connected to each side of the bistable multivibrator switch a D.C. voltmeter between the two converter outputs, thereby providing the meter with a continuous D.C. voltage the magnitude of which is a measure of the average input pulse width.

BRIEF DESCRIPTION OF THE DRAWINGS

The invention will be more readily understood from the following detailed description taken in conjunction with the accompanying drawings in which:

FIG. 1 is a schematic block diagram of one embodiment of the present invention; and FIG. 2 is a family of waveforms versus time ($t$) useful in describing the operation of the embodiment shown in FIG. 1.

DETAILED DESCRIPTION

In FIG. 1 a pulse train containing pulses whose average pulse width is to be determined is applied to input terminals 10 and 11 of a trigger circuit 12. Circuit 12 may be a Schmitt trigger circuit of the type shown, for example, in FIG. 7.18B, page 200 of the "General Electric Transistor Manual," 1964. Circuit 12 operates to shape the pulses of the input pulse train into rectangular pulses of the type shown as waveform A in FIG. 2. During the interval between pulses, the potential on line 13 is substantially equal to zero, as shown in waveform A of FIG. 2 as potential 101. With about zero volts on line 13, diode 14, having its cathode connected to line 13 and its anode connected to a charging capacitor 15 of a unijunction transistor relaxation oscillator 16, is forward-biased and therefore clamps charging capacitor 15 to a potential lower than that which is required for the operation of the relaxation oscillator 16.

A conventional relaxation oscillator of the type designated as 16 is shown in FIG. 13.21(A), page 315 of the "General Electric Transistor Manual," 1964.

At $t=T_1$ in waveform A of FIG. 2, voltage pulse 103 causes a rise in potential on line 13 of sufficient magnitude to back-bias diode 14, thereby permitting oscillator 16 to produce voltage impulses on line 17 at the output of relaxation oscillator 16. These voltage impulses will continue at a rate determined by the time constant of the charging capacitor 15 within oscillator 16 for the duration of the pulse 103, as shown in waveform B of FIG. 2. At the termination of pulse 103 at $t=T_2$, the drop in potential on line 13, coupled through capacitor 18 to the trigger input 19 of a conventional bistable multivibrator 20 of the type shown in FIGS. 10–6, page 371 of "Pulse, Digital and Switching Waveforms," Millman and Taub, 1965, serves to switch multivibrator 20.

Prior to the instant $t=T_2$, bistable multivibrator 20 will be in one of its stable states. Assume for purposes of the present description that priod to the instant $t=T_2$ the state of multivibrator 20 is such that P1 is at zero volts as shown in waveform C of FIG. 2 and P2 is at $+V$ volts as shown in waveform D of FIG. 2. As a result of these potentials the operation of gates 21 and 22 is such that the voltage impulses on line 17 during the interval between instants $T_1$ and $T_2$ are coupled through a gate 22 to line 33 the input of a digtal to analog converter 24, and the impulses on line 17 during this interval are prohibited from passing through a gate 21 to line 26, the input of a digital to analog converter 25.

Gates 21 and 22 are identical in their internal operation but operate out-of-phase due to the fact that the operation of gate 21 is determined by the potential at point P2, whereas the operation of gate 22 is determined by the potential at point P1 at the other side of bistable mulivibrator 20.

Positive potential source 27 is connected through resistor 28 and back-biased Zener diode 29 to ground potential. The positive potential thereby established across Zener diode 29 is applied to the emitter electrodes of gating transistors 31 and 32 in gates 21 and 22, respectively. This potential from Zener diode 29 is sufficient to back-bias the base-to-emitter junction of either gating transistor when the potential presented to the base of the transistor by either points P1 or P2 through resistors 30 or 46, respectively, is substantially equal to ground potential. When, however, the potential at either points P1 or P2 is equal to +V volts the corresponding gating transistor is forward-biased into conduction, thereby providing a substantially zero impedance between its collector and emitter electrodes. With substantially zero impedance between the collector and emitter electrodes of a shunt gating transistor, the voltage impulses presented on line 17 to its particular gate are not permitted to pass through the gate.

For example, during the interval between $T_1$ and $T_2$ point P2 is at +V volts, as shown in waveform D of FIG. 2, and therefore transistor 31 of gate 21 is in conduction. The substantially zero impedance between the collector and emitter electrodes of transistor 31 operates in conjunction with resistor 47 of gate 21 as an attenuation to the voltage impulses from line 17. During the same interval, however, point P1 is at about zero volts potential, and therefore transistor 32 of gate 22 is not in conduction. Consequently, the voltage impulses from line 17 are permitted to pass through resistor 33 and coupling capacitor 35 of gate 22 to line 23, the input of digital to analog converter 24.

After bisable multivibrator 20 has been triggered to its other stable state with point P1 at +V volts and points P2 at zero volts, the operation of gates 21 and 22 is reversed in that voltage impulses from line 17 will be coupled by way of gate 21 to digital to analog converter 25, whereas gate 22 will prohibit voltage impulses on line 17 from being coupled to digital to analog converter 24.

Digital to analog converters 24 and 25 produce D.C. voltages at their respective outputs which are respectively proportional to the number of voltage impulses delivered to their respective inputs after the converters have been reset. Converters 24 and 25 are identical in their construction and are of the type shown and described in FIGS. 18–4, pages 675 of "Pulse, Digital and Switching Waveforms," Millman & Taub, 1965. As indicated hereinabove, the voltage impulses from line 17 during the interval between instants $T_1$ and $T_2$ are coupled through gate 22 to digital to analog converter 24. At $t=T_2$ a D.C. potential which is proportional to the number of voltage impulses between instants $T_1$ and $T_2$ is developed at output 36 of converter 24.

As shown in waveform C of FIG. 2, the potential at point P1 is equal to +V volts after the instant $t=T_2$. In a gate 50 connected to the output of converter 24, a diode 51 whose cathode is connected to point P1 is back-biased by the +V volts, and the D.C. potential from output 36 is coupled by gate 50 through a diode 52 to one terminal of a D.C. voltmeter 60. At the same time after instant $T_2$, point P2 provides a potential of zero volts to the cathode of a diode 56 in gate 55, thereby preventing any potential which appears on output line 37 of converter 25 from being coupled through a diode 57 of gate 55 to D.C. voltmeter 60.

In order to insure that the forward-bias potential across diode 51 or 56 in series with the collector-to-emitter voltage of a conducting transistor in multivibrator 20 will not forward-bias diode 52 or 57, respectively, diodes 61 and 62 are series connected between the other terminal of D.C. voltmeter 60 and ground potential. The potential developed across these two diodes 61 and 62 when they are forward biased is greater than the potential developed across a conducting transistor in multivibrator 20. Consequently, when a transistor of multivibrator 20 is in conducton, the potential at the output of a converter connected through a diode to that conducting transistor is certain to be bypassed to ground and not be applied to voltmeter 60.

At $t=T_3$ a second voltage pulse 106 shown in waveform A of FIG. 2 is coupled from Schmitt trigger circuit 12 via line 13 through diode 14 to the relaxation oscillator 16. During pulse 106, oscillator 16 is again permitted to produce voltage impulses on line 17. The potential rise of voltage pulse 106 at $T_3$, however, does not present a triggering impulse of the proper polarity on trigger input 19 of multivibrator 20 so as to operate multivibrator 20 to its other stable state. Accordingly, gates 21, 22, 50 and 55 remain in the states which are established immediately following instant $T_2$.

During pulse 106 voltage impulses on line 17 are coupled through gate 21 to the input of digital to analog converter 25 as shown in waveform C of FIG. 2. At the termination of pulse 106, designated as instant $T_4$ in FIG. 2, the full D.C. potential corresponding to the number of voltage impulses during pulse 106 has been established at the output of converter 25. The drop in potential on line 13 at $T_4$ is coupled to the triggering input 19 of multivibrator 20, thereby causing multivibrator 20 to switch to the stable state which existed prior to $t=T_2$. Accordingly, the potentials at points P1 and P2 after $T_4$ are such that the path through gate 55 is closed and therefore the D.C. potential from converter 25 is coupled to D.C. voltmeter 60, whereas the path through gate 50 is open and the D.C. potential from converter 24 is prevented from being coupled to D.C. voltmeter 60.

The positive rise in potential which occurs at point P2 at $t=T_4$ is differentiated by capacitor 40 and resistor 41 to produce a voltage impulse 108 which is coupled via diode 42 to the reset input of converter 24. Accordingly, converter 24 is cleared of its potential which was established during pulse 103 and was coupled to D.C. voltmeter 60 through gate 50 during the interval between $T_2$ and $T_4$; converter 24 is therefore prepared to receive the next group of voltage impulses provided on line 17 by a third pulse shown as 109 in waveform A of FIG. 2. In a similar manner, capacitor 45 and resistor 43 differentiate the voltage rise which occurs at point P1 at $t=T_2$ and $t=T_6$ to produce a voltage impulse 111 which is coupled via diode 44 to the reset input of converter 25.

Operation of the FIG. 1 embodiment is summarized in waveforms I and J of FIG. 2 which indicate the intervals during which converters 24 and 25, respectively, sample the input voltage pulse width and hold the D.C. potential established by the sampling for application to D.C. voltmeter 60. As indicated in waveforms I and J, the entire circuit cycles in a period equal to two input voltage pulses. During the interval between the termination of one input voltage pulse and the termination of the next input voltage pulse, converter 24 samples the input voltage pulse whereas converter 25 holds the D.C. potential established during a previous sampling while this potential is applied to D.C. voltmeter 60. During the next interval between terminations of succeeding input voltage pulses, converter 25 samples the input voltage pulse whereas converter 24 holds the D.C. potential established during the previous sampling while its potential is applied to D.C. voltmeter 60.

It is to be understood that the above-described embodiment is illustrative of the application of the principles of the present invention and numerous modifications thereof may be devised by those skilled in the art without departing from the spirit and scope of the invention.

What is claimed is:

1. In a circuit for measuring the average width of rectangular pulses in an input pulse train, means responsive to each of said rectangular pulses for generating a group of pulses the number of which corresponds to the width of the rectangular pulse, first and second converters for producing D.C. potentials proportional to the number of pulses in an applied pulse group, means for applying alternate ones of said pulse groups to said first and second converters, and indicating means alternately responsive to the potentials produced by said converters.

2. Apparatus for measuring the average pulse width in an input pulse train comprising a first and second digital to analog converter means each providing a D.C. potential at its output proportional to the number of voltage impulses coupled to its input, means for producing voltage impulses during each input pulse interval, the number of voltage impulses produced being an indication of the length of said interval, means for coupling the voltage impulses corresponding to alternate input pulses to said first converter means and the voltage impulses corresponding to the other input pulses to said second converter means, a D.C. voltmeter, and means for coupling said voltmeter to the output of said second converter means during intervals including said alternate input pulses and to the output of said first converter means during intervals including said other input pulses.

3. Apparatus as defined in claim 2 wherein said means for coupling the voltage impulses includes a first gating means connected between said impulse producing means and said first converter means, second gating means connected between said impulse producing means and said second converter means, and switching means connected to alternately operate said first and second gating means in response to the termination of each input pulse.

4. Apparatus as defined in claim 3 wherein said means for coupling said voltmeter includes a third gating means connected between the output of said first converter means and said voltmeter, and a fourth gating means connected between the output of said second converter means and said voltmeter, said third and fourth gating means connected to operate in response to said switching means.

5. In apparatus for measuring the average pulse width in an input pulse train, the combination comprising first and second means for producing a D.C. potential proportional to the width of an input pulse, said first potential producing means being responsive to alternate input pulses and said second potential producing means being responsive to the other input pulses, means for resetting said first potential producing means at the termination of said other input pulses, means for resetting said second potential producing means at the termination of said alternate input pulses, a D.C. voltmeter, and means for switching said voltmeter between said first and second potential producing means, said voltmeter being switched to one of said first and second potential producing means at the instant when the other one of said potential producing means is reset.

6. The combination as defined in claim 5 wherein the combination further includes a bistable multivibrator having two outputs and a triggering input connected to respond to the termination of each input pulse, means for connecting one of said two multivibrator outputs to said means for resetting said first potential producing means, and means for connecting the other of said two multivibrator outputs to said means for resetting said second potential producing means.

7. Apparatus for measuring the average pulse in an input pulse train comprising means for producing voltage impulses during each input pulse interval, a bistable multivibrator having two stable states and triggered to alternate stable states in response to the termination of each input pulse, first and second digital to analog converter for providing D.C. voltages at their respective outputs in proportion to the number of voltage impulses at their respective inputs, a first gating means for coupling the voltage impulses to the input of said first converter in response to said bistable multivibrator being in a first one of its two stable states, a second gating means for coupling the voltage impulses to the input of said second converter in response to said bistable multivibrator being in the other one of its two stable states, a D.C. voltmeter, third gating means for coupling the output of said first converter to said D.C. voltmeter in response to said bistable multivibrator being in said other one of its two bistable states, a fourth gating means for coupling the output of said second converter to said D.C. voltmeter in response to said bistable multivibrator being in said first one of its two bistable states, and means for resetting said first converter at the instant when said multivibrator is transferred to said first one of its two stable states and for resetting said second converter at the instant when said multivibrator is transferred to said other one of its two stable states.

References Cited

UNITED STATES PATENTS 3,304,507    2/1967    Weekes et al. _____ 328—151

RUDOLPH V. ROLINEC, Primary Examiner

E. F. KARLSEN, Assistant Examiner

U.S. Cl. X.R.

324—120